(12) United States Patent
Weiss

(10) Patent No.: US 8,026,643 B2
(45) Date of Patent: Sep. 27, 2011

(54) ELECTRICAL MACHINE WITH AN INTERNALLY COOLED ROTOR

(75) Inventor: Sebastian Weiss, Oberasbach (DE)

(73) Assignee: Siemens Aktiengesellschaft, München (DE)

( * ) Notice: Subject to any disclaimer, the term of this patent is extended or adjusted under 35 U.S.C. 154(b) by 209 days.

(21) Appl. No.: 12/441,049

(22) PCT Filed: Sep. 11, 2007

(86) PCT No.: PCT/EP2007/059493
§ 371 (c)(1),
(2), (4) Date: Mar. 12, 2009

(87) PCT Pub. No.: WO2008/031804
PCT Pub. Date: Mar. 20, 2008

(65) Prior Publication Data
US 2009/0230790 A1    Sep. 17, 2009

(30) Foreign Application Priority Data
Sep. 14, 2006  (DE) .................. 10 2006 043 169

(51) Int. Cl.
*H02K 9/00* (2006.01)

(52) U.S. Cl. ............... 310/58; 310/59; 310/61
(58) Field of Classification Search .......... 310/58, 310/59, 61, 60 A
See application file for complete search history.

(56) References Cited

U.S. PATENT DOCUMENTS

| 2,043,655 | A  | * | 6/1936 | Ehrmann | 310/57 |
| 2007/0024130 | A1 | * | 2/2007 | Schmidt | 310/61 |
| 2007/0035187 | A1 | * | 2/2007 | Verhaegen | 310/59 |

FOREIGN PATENT DOCUMENTS

| DE | 10 99 064 B | 2/1961 |
| DE | 1 538 938 A1 | 8/1970 |
| DE | 17 69 889 A1 | 11/1971 |
| DE | 42 42 132 A1 | 6/1994 |
| DE | 196 48 455 A1 | 10/1997 |
| DE | 199 05 540 A1 | 8/2000 |
| DE | 199 08 246 A1 | 8/2000 |

(Continued)

OTHER PUBLICATIONS

DE 10107298 C1 machine translation document.*

*Primary Examiner* — Quyen Leung
*Assistant Examiner* — Leda Pham
(74) *Attorney, Agent, or Firm* — Henry M. Feiereisen; Ursula B. Day

(57) ABSTRACT

The invention relates to an electrical machine with an internally cooled rotor. In order to improve the cooling power of such a machine without the use of a fan wheel fitted separately on the rotor, the invention proposes an electrical machine with a stator laminate stack and a rotor in a housing, which electrical machine has an internal cooling circuit comprising rotor cooling channels, which pass axially through the rotor and are arranged on two concentric circles, in which internal cooling circuit a gaseous coolant can be circulated, wherein fan vanes and a first means for guiding the coolant from the rotor cooling channels on one of the two concentric circles via a winding head to the rotor cooling channels on the other of the two concentric circles are provided in the case of the machine on a first rotor end side. As a result, particularly those regions are cooled optimally in which the dissipation of lost heat is problematic.

14 Claims, 2 Drawing Sheets

FOREIGN PATENT DOCUMENTS

| | | |
|---|---|---|
| DE | 44 43 427 C2 | 4/2002 |
| DE | 101 07 298 C1 | 7/2002 |
| DE | 10107298 C1 * | 7/2002 |
| EP | 0 909 004 A2 | 4/1999 |
| RU | 2084069 C1 | 7/1997 |
| RU | 2101836 C1 | 1/1998 |
| SU | 1171908 A | 8/1985 |
| SU | 1815743 A1 | 5/1993 |

* cited by examiner

ELECTRICAL MACHINE WITH AN INTERNALLY COOLED ROTOR

CROSS-REFERENCES TO RELATED APPLICATIONS

This application is the U.S. National Stage of International Application No. PCT/EP2007/059493, filed Sep. 11, 2007, which designated the United States and has been published but not in English as International Publication No. WO 2008/031804 and which claims the priority of German Patent Application, Serial No. 10 2006 043 169.3, filed Sep. 14, 2006, pursuant to 35 U.S.C. 119(a)-(d).

BACKGROUND OF THE INVENTION

The invention relates to an electrical machine with an internally cooled rotor.

One power-limiting factor of electrical machines is the quality of the heat-loss dissipation. Particularly in embodiments in which the hot parts within the machine are not cooled directly by the cooling medium, it is difficult to make use of the active mass that is used. Specific zones in which the dissipation of heat losses is problematic are the end windings and the rotor. If it is possible to specifically pass heat from these two zones to the surrounding area, the power of an electrical machine can be increased, with the physical volume remaining the same.

DE 42 42 132 A1 discloses a cooling system for an electrical machine which is in the form of an internal cooling circuit system. In the case of this internal cooling, it is possible for flow to pass axially through the rotor cooling channels in both directions. A machine-internal cooling circuit is generated by using the rotor cooling channels for flow to pass through in two directions. In order to make this cooling circuit operate, two fans are required, on each of the end faces of the rotor.

DE 44 43 427 C2 discloses an internal cooling circuit system in which flow passes through the rotor from one end. The cooling air flow is blown against the end winding by means of fan blades which are provided on the rotor and located radially within the end winding. The cooling air flows via cooling channels, which are arranged on the stator circumference, to the other machine end, where it passes via the end winding to the rotor, and finally enters the rotor cooling channels, from which it is passed to the fan blades again.

The invention is based on the object of improving the cooling performance of an electrical machine with an internally cooled rotor, without using a fan impeller mounted separately on the rotor.

This object is achieved by an electrical machine having a laminated stator core in a housing and having a rotor which electrical machine has an internal cooling circuit comprising rotor cooling channels which pass axially through the rotor and are arranged on two concentric circles, in which internal cooling circuit a gaseous coolant can circulate wherein fan blades and a first means for guiding the coolant from the rotor cooling channels on one of the two concentric circles via an end winding to the rotor cooling channels on the other of the two concentric circles are provided on a first rotor end face of the machine.

The guidance of the coolant which, for example, may be air or an inert gas through the rotor cooling channels in both directions on the various concentric circles, wherein the coolant circuit is driven by fan blades which are fitted on the rotor end face and is in this case blown directly onto an end winding by the means for guiding the coolant, results in optimum cooling in particular in those areas in which the dissipation of heat losses is problematic. In this case, the fan blades pragmatically extend axially from the rotor end face, but may also each have some other expedient form. Since the solution according to the invention does not require a separate fan impeller, no additional machining of the rotor shaft for fan impeller mounting is required here, thus making it possible to also achieve a shorter axial physical length of the electrical machine, in addition to saving costs.

In one advantageous form of the refinement, the first means for guiding the coolant is in the form of an air guide cylinder, which is arranged between the two concentric circles, extends axially from the first rotor end face to in front of the fan blades and has a part which points outwards in front of the fan blades. In this case, the air guide cylinder need not have a strictly cylindrical shape in front of the part which points outwards, but can essentially correspond to half a single-shell rotation hyperboloid. The coolant flow which emerges from the rotor cooling channels on, for example, the outer of the two concentric circles is thus passed directly to the end winding in a simple manner. That part of the air guide cylinder which is arranged axially in front of the fan blades and points outwards creates a space which extends from the output of the rotor cooling channels on the relevant rotor end face to the fan blades. This considerably improves the coolant guidance in the internal cooling circuit.

In a further advantageous embodiment, a second means, for guiding the coolant, which is formed identically to the first means for guiding the coolant is arranged on a second rotor end face. This likewise considerably improves the cooling guidance in the internal cooling circuit in the area of the end winding, on the side of the second rotor end face.

In a further advantageous embodiment, the fan blades on the first rotor end face are designed such that they feed the coolant radially outwards. The force which acts radially outwards on the coolant in this case has superimposed on it the inertial force of the coolant emerging from the rotor cooling channels to form a total force which already acts on the coolant essentially in the direction of the end winding. This further improves the through-flow since less swirling occurs in this case in comparison for example, to an axial feed in which the coolant flow is guided only by the means for guiding the coolant to the end winding.

In a further advantageous embodiment, axially extending fan blades are provided on the second rotor end face and are designed such that a coolant flow which is caused by the fan blades provided on the first rotor end face is increased. This means that the fan blades on the second rotor end face feed the coolant in a direction which points between radially and axially inwards, when the fan blades on the first rotor end face are provided for feeding in a direction between radially and axially outwards.

In a further advantageous embodiment, that part of the at least one air guide cylinder which points outwards rests directly on a respective radially running end edge of the fan blades or is axially at a short distance from these end edges. This virtually completely suppresses leakage flows with respect to the coolant flow passing through the rotor cooling channels.

In a further advantageous embodiment, that part of the at least one air guide cylinder which points outwards extends radially at least to a circumferential edge, which is located radially on the outside, of the fan blades. This avoids branching flows bypassing the end winding.

In a further advantageous embodiment, when the rotor is in the form of a squirrel-cage rotor, the fan blades are formed on the corresponding short-circuiting ring. There is therefore no need to produce the fan blades separately and to fit them separately to the rotor.

In a further advantageous embodiment, the rotor cooling channels have a cross section with a circumference which is larger than that of a circle with the same cross-sectional area. In this case, by way of example, the cross section may have a corrugated circumference or may have a polygonal shape or may be in the form of a star. This provides a larger heat transfer area for cooling the rotor.

In a further advantageous embodiment, for each concentric circle on the rotor end face, a center point of a rotor cooling channel and a fan blade are arranged radially from the inside outwards in a line. This results, so to speak, in there being a dedicated fan blade for each rotor cooling channel, thus improving the feed effect of the fan blades on the coolant.

In a further advantageous embodiment, the sum of the cross-sectional areas of the rotor cooling channels on one of the two concentric circles is equal to the sum of the cross-sectional areas of the rotor cooling channels on the other of the two concentric circles. This ensures that there is a uniform flow through the rotor cooling channels on the various concentric circles, thus avoiding swirling resulting from different flow speeds.

In a further advantageous embodiment, primary cooling channels, through which a cooling medium flows, for an outer cooling circuit are provided on the housing circumference. The dissipation of heat to a primary cooling medium, which may be gaseous or liquid, considerably improves the recooling of the coolant in the internal circuit.

In a further advantageous embodiment, the primary cooling channels are in this case arranged in a helical shape on the housing circumference. This results in more uniform cooling with respect to the housing circumference, in comparison to primary cooling channels which are provided only in the corners of, for example, a rectangular housing, resulting in a simpler design than, for example, in the case of a meandering structure of the primary cooling channels.

In a further advantageous embodiment, the pitch height between successive turns of the helically arranged primary cooling channels is in this case less in the area of the end windings than in the area between the end windings. The cooling effect is therefore particularly high in those areas in which the recooling of the coolant in the internal circuit is provided by means of the primary cooling medium.

In a further advantageous embodiment, cooling ribs are provided on the housing circumference. This results in a particularly large surface area being available for exchange of heat with the environment or the primary cooling medium.

In a further advantageous embodiment, the machine is in the form of an asynchronous machine. In this case, the fan blades can be cast directly on a short-circuiting ring of, for example, an aluminum die-cast rotor.

BRIEF DESCRIPTION OF THE DRAWING

The invention will be described and explained in more detail in the following text with reference to the exemplary embodiments which are illustrated in the figures, in which.

DETAILED DESCRIPTION OF PREFERRED EMBODIMENTS

Figure 1:
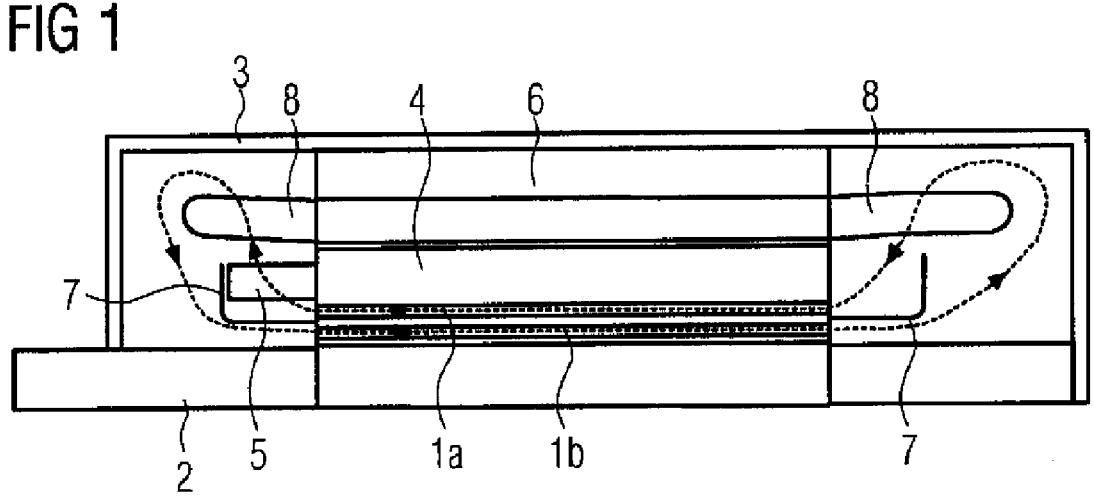
FIG. 1 shows one half of an electrical machine, in the form of a longitudinal section.
Figure 3:
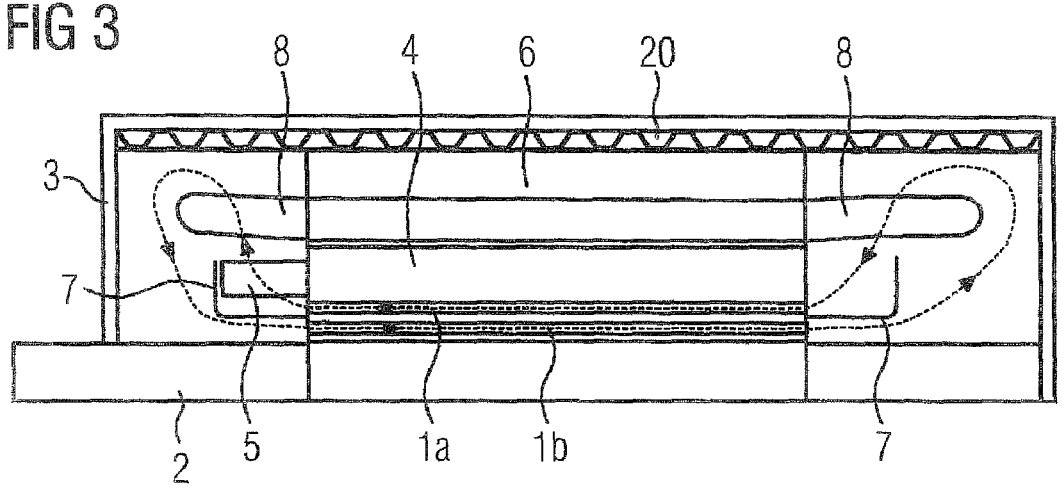
FIG. 3 shows a longitudinal section of one half of an electrical machine with outer cooling circuit.
Figure 4:
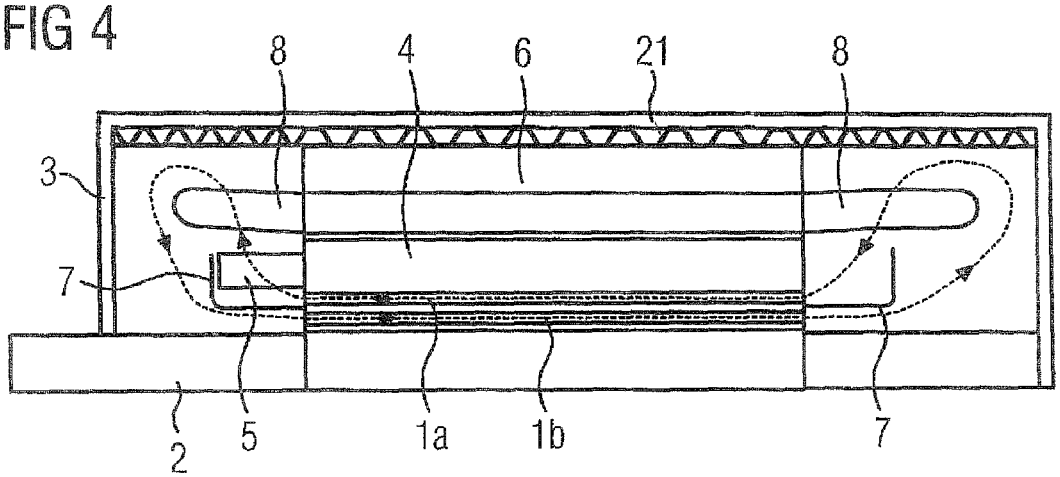
FIG. 4 shows a longitudinal section of one half of an electrical machine with outer cooling ribs.

FIG. 1 shows one half of an electrical machine with a laminated stator core 6 and a rotor 2 in a housing 3, in the form of a cross section. Rotor cooling channels 1a, 1b are arranged on two concentric circles between the shaft of the rotor 2 and the active part 4. Fan blades 5 are fitted to the left-hand rotor end face and feed the circulated coolant, which flows out of the rotor cooling channels 1a located on the outer circle, radially outwards. Together with the inertia movement of the coolant flowing out of the rotor cooling channels 1a, this results in an essentially radially directed movement of the coolant, wherein an air guide cylinder 7, which is fitted between the two concentric circles, ensures that the coolant is blown directly onto the end winding 8, and that no swirling occurs with the coolant flowing back to the right-hand side of the machine through the rotor cooling channels 1b which are arranged on the inner circle. An air guide cylinder 7 is likewise fitted to the rotor end face on the right-hand side in order to guide the coolant in a suitable manner through the spaces between the housing 3 and the active part 4, where the recooling of the coolant by the primary cooling medium also takes place. As shown in FIG. 3, primary cooling channels 20, shown here of helical configuration, are provided through which the coolant flows for an outer cooling circuit on the housing circumference. As an alternative, as shown in FIG. 4, cooling ribs 21 can be provided on the housing circumference. The dashed line in FIG. 1 shows the flow path of the coolant with the flow passing through the rotor 2 from two ends. The fan blades 5 which are fitted to the rotor end face cause the coolant, for example air, to rotate, and this results in a radial pressure rise. These fan blades 5 may be cast directly on the short-circuiting rings in the case, for example, of asynchronous machines with aluminum die-cast rotors.

Figure 2:
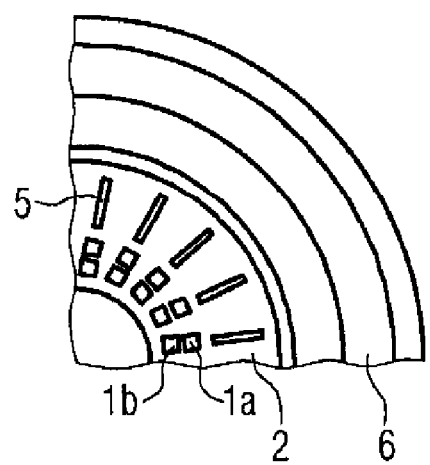
FIG. 2 shows a detail of a laminated stator core and rotor, in the form of a cross section.

FIG. 2 shows a detail of a laminated stator core 6 and rotor 2, in the form of a cross section. A rotor cooling channel 1a, 1b and a fan blade 5 are arranged from the inside outwards for each concentric circle. In order to enlarge the heat exchanging area, the rotor cooling channels 1a, 1b have a quadrilateral cross section rather than a round cross section. In this case, the cross-sectional area of the rotor cooling channels 1a, 1b is of the same size on both concentric circles, thus avoiding swirling caused by different flow speeds.

In summary, the invention relates to an electrical machine with an internally cooled rotor. In order to improve the cooling performance for a machine such as this without using a fan impeller fitted separately to the rotor, an electrical machine is proposed having a laminated stator core and a rotor in a housing, which electrical machine has an internal cooling circuit comprising rotor cooling channels which pass axially through the rotor and are arranged on two concentric circles, in which internal cooling circuit a gaseous coolant can circulate wherein fan blades and a first means for guiding the coolant from the rotor cooling channels on one of the two concentric circles via an end winding to the rotor cooling channels on the other of the two concentric circles are provided on a first rotor end face of the machine. This results in optimum cooling in particular in those areas in which the dissipation of heat losses is problematic.

What is claimed is:

1. An electrical machine, comprising:
a housing;
a laminated stator core received in the housing and having opposite end windings;
a rotor;
an internal cooling circuit comprising rotor cooling channels extending axially through the rotor and arranged on two concentric circles for circulation of a gaseous coolant;
fan blades provided on a first rotor end face of the rotor and located entirely radially outside of an outer one of the two concentric circles of the rotor cooling channels;
a first air guide cylinder arranged between the two concentric circles interacting with the fan blades to guide the coolant from one of the rotor cooling channels on one of the two concentric circles across one of the end windings to the other one of the rotor cooling channels on the other one of the two concentric circles, said first air guide cylinder extending axially from the first rotor end face and terminating in an outwardly pointing part positioned axially outside of the fan blades, wherein the outwardly pointing part of the first air guide cylinder extends radially at least to a radially outer circumferential edge of the fan blades; and
a second air guide cylinder arranged on a second rotor end face of the rotor for guiding the coolant,
wherein the first and second air guide cylinders are identical in shape and size.

2. The electric machine of claim 1, wherein the second air guide cylinder is arranged between the two concentric circles to guide the coolant from the other one of the rotor cooling channels on the other one of the two concentric circles across the other one of the end windings to the one of the rotor cooling channels on the one of the two concentric circles.

3. The electric machine of claim 1, wherein the outwardly pointing part of the first air guide cylinder rests directly on a respective radial end edge of the fan blades.

4. The electric machine of claim 1, wherein the outwardly pointing part of the first air guide cylinder is positioned at a close distance to a respective radial end edge of the fan blades.

5. The electric machine of claim 1, wherein the fan blades on the first rotor end face are constructed to guide the coolant radially outwards.

6. The electric machine of claim 1, further comprising axially extending fan blades on the second rotor end face and constructed to boost a coolant flow generated by the fan blades on the first rotor end face.

7. The electric machine of claim 1, wherein the rotor is constructed in the form of a squirrel-cage rotor, said fan blades being formed on a corresponding short-circuiting ring of the squirrel-cage rotor.

8. The electric machine of claim 1, wherein a center point of a rotor cooling channel and a fan blade are arranged radially from the inside outwards in a line for each concentric circle on the rotor end faces.

9. The electric machine of claim 1, wherein a sum of cross-sectional areas of the rotor cooling channels on one of the two concentric circles is equal to a sum of cross-sectional areas of the rotor cooling channels on the other of the two concentric circles.

10. The electric machine of claim 1, wherein the housing has a circumference formed with primary cooling channels for passage of a cooling medium to provide an outer cooling circuit.

11. The electric machine of claim 10, wherein the primary cooling channels are arranged in a helical shape on the circumference of the housing.

12. The electric machine of claim 11, wherein a pitch height between successive turns of the helical primary cooling channels is smaller in an area of the end windings than in an area between the end windings.

13. The electric machine of claim 1, wherein the housing has a circumference formed with cooling ribs.

14. The electric machine of claim 1, constructed in the form of an asynchronous machine.

\* \* \* \* \*